United States Patent
Yoon

(10) Patent No.: US 9,862,387 B2
(45) Date of Patent: Jan. 9, 2018

(54) METHOD FOR PROTECTING CLUTCH OF VEHICLE

(71) Applicant: Hyundai Motor Company, Seoul (KR)

(72) Inventor: Young Min Yoon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 77 days.

(21) Appl. No.: 15/002,050

(22) Filed: Jan. 20, 2016

(65) Prior Publication Data

US 2017/0088137 A1    Mar. 30, 2017

(30) Foreign Application Priority Data

Sep. 24, 2015  (KR) .................. 10-2015-0135300

(51) Int. Cl.
| | |
|---|---|
| *B60W 30/186* | (2012.01) |
| *B60W 10/06* | (2006.01) |
| *F16D 48/06* | (2006.01) |
| *B60W 10/11* | (2012.01) |

(52) U.S. Cl.
CPC .......... *B60W 30/186* (2013.01); *B60W 10/06* (2013.01); *B60W 10/11* (2013.01); *F16D 48/06* (2013.01); *B60W 2510/0291* (2013.01); *B60W 2710/0644* (2013.01); *B60W 2710/1005* (2013.01); *F16D 2500/106* (2013.01); *F16D 2500/108* (2013.01); *F16D 2500/30403* (2013.01); *F16D 2500/30404* (2013.01)

(58) Field of Classification Search
None
See application file for complete search history.

(56) References Cited

U.S. PATENT DOCUMENTS

| | | | | |
|---|---|---|---|---|
| 8,167,774 | B2* | 5/2012 | Jaeggle | F16H 61/12 477/174 |
| 9,026,295 | B2* | 5/2015 | Inoue | B60W 20/40 701/22 |
| 9,121,457 | B2 | 9/2015 | Lee | |
| 2004/0061603 | A1* | 4/2004 | Mack | F16D 48/06 340/453 |
| 2013/0345940 | A1* | 12/2013 | Redbrandt | F16D 48/06 701/53 |
| 2014/0088813 | A1* | 3/2014 | Kobayashi | B60L 15/2045 701/22 |

(Continued)

FOREIGN PATENT DOCUMENTS

| | | |
|---|---|---|
| EP | 1657463 B9 | 11/2008 |
| JP | H 03-125030 A | 5/1991 |

(Continued)

*Primary Examiner* — Jacob S. Scott
*Assistant Examiner* — Timothy Hannon
(74) *Attorney, Agent, or Firm* — Brinks Gilson & Lione

(57) ABSTRACT

Disclosed is a method for protecting a vehicle clutch, including a check step for checking the mileage of a vehicle and the number of times a clutch wear compensation device is operated; after the check step, a calculation step for calculating a clutch thermal severity level, which indicates the degree of thermal severity of the clutch, based on the mileage and the number of times the wear compensation device is operated; and a control step for controlling at least one of the shifting pattern of the vehicle and engine RPM depending on the clutch thermal severity level, after the calculation step.

13 Claims, 3 Drawing Sheets

(56) References Cited

U.S. PATENT DOCUMENTS

2015/0073673 A1\* 3/2015 Hata ................. F16D 48/06
  701/68

FOREIGN PATENT DOCUMENTS

| JP | 2006-132562 A | 5/2006 |
| JP | 2015068386 A | 4/2015 |
| KR | 1999-0047660 | 7/1999 |
| KR | 10-2009-0053998 | 5/2009 |
| KR | 10-2013-0001482 A | 1/2013 |
| KR | 1002013-0001482 A | 1/2013 |
| WO | WO 2008/036014 A1 | 3/2008 |

\* cited by examiner

METHOD FOR PROTECTING CLUTCH OF VEHICLE

CROSS REFERENCE TO RELATED APPLICATION

The present application claims the benefit of and priority to Korean Patent Application No. 10-2015-0135300, filed Sep. 24, 2015, the entire contents of which is incorporated herein by reference.

FIELD

The present disclosure generally relates to a method for protecting a vehicle clutch that determines whether a clutch is in a thermally severe condition in which the clutch may overheat and prevents the clutch from overheating.

BACKGROUND

A Dual Clutch Transmission (DCT) is a system for automatically controlling a manual transmission, and delivers engine torque using a dry clutch unlike a general automatic transmission that uses a torque converter and a wet-type multidisc clutch. In the case of a dry clutch, cooling is difficult once it is heated, and when the temperature of the clutch increases, friction performance considerably drops, and thus power may not be delivered. Also, continuous clutch slip causes clutch fade-out, and it may lead to the failure of the clutch.

According to a conventional art, a vehicle having a DCT operates functions for protecting a clutch when the temperature of the clutch increases higher than certain temperature, but such functions limit the driving performance of the vehicle, thus reducing the driving performance.

The foregoing is intended merely to aid in the understanding of the background of the present disclosure, and is not intended to mean that the present disclosure falls within the purview of the related art that is already known to those skilled in the art.

SUMMARY

Accordingly, the present disclosure provides a vehicle clutch protection method that prevents a clutch from overheating by controlling a shifting pattern and revolution per minute (RPM) of engine depending on the mileage of a vehicle and the number of times a wear compensation device is operated.

A method for protecting a vehicle clutch according to the present disclosure may include: a check step in which a controller checks a mileage of a vehicle and a number of times a clutch wear compensation device is operated; after the check step, a calculation step in which the controller calculates a clutch thermal severity level, which indicates a degree of thermal severity of the clutch, based on the mileage and the number of times the wear compensation device is operated; and after the calculation step, a control step in which the controller controls at least one of a shifting pattern of the vehicle and engine RPM depending on the clutch thermal severity level.

In the calculation step, the clutch thermal severity level may be calculated to be inversely proportional to the mileage and to be proportional to the number of times the wear compensation device is operated.

The clutch wear compensation device may operate when a variation in a clutch touch point is greater than a reference value.

The calculation step may be performed only when the mileage of the vehicle is equal to or greater than a predetermined distance.

The calculation step may be performed only when the number of times the wear compensation device is operated is equal to or greater than a predetermined count value.

In the control step, as the clutch thermal severity level is higher, the controller may control an upshifting pattern to perform upshifting at a higher speed compared to an existing upshifting pattern.

In the control step, as the clutch thermal severity level is higher, the controller may control a downshifting pattern to perform downshifting at a higher speed compared to an existing downshifting pattern.

In the control step, as the clutch thermal severity level is higher, the controller may control the engine RPM to be less than current engine RPM.

According to the vehicle clutch protection method configured as described above, the driving style of a driver or the condition of a road on which a vehicle is mainly driven may be determined based on the mileage of the vehicle and the number of times that a wear compensation device is operated, and a control method for preventing the clutch from overheating is performed based on a clutch thermal severity level, whereby occurrence of failure caused by overheating of the clutch may be prevented.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinafter, a method for protecting a vehicle clutch, according to an embodiment of the present disclosure, is described with reference to the accompanying drawings.

Figure 1:
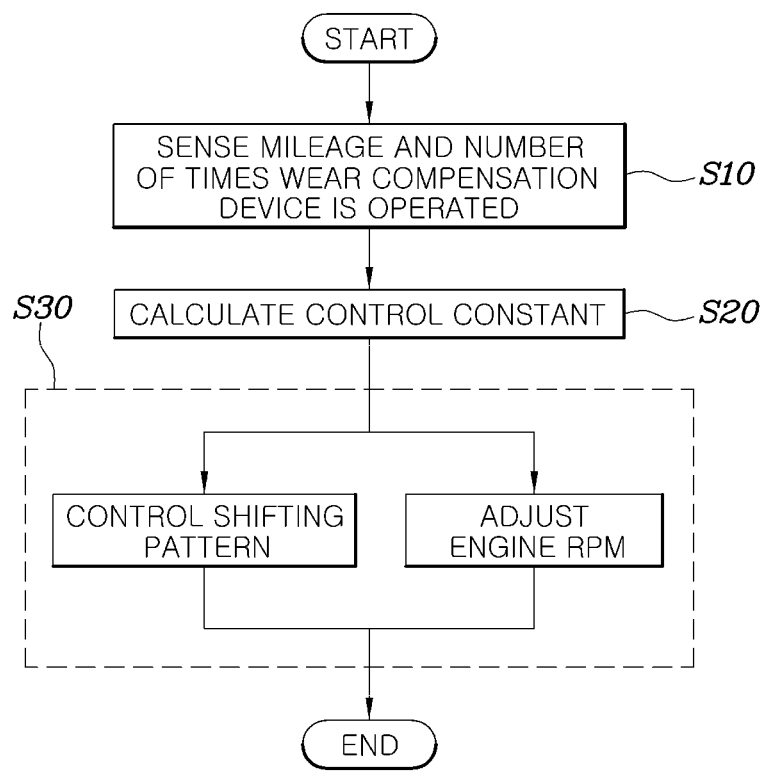
FIG. 1 is a flowchart illustrating a method for protecting a vehicle clutch, according to an embodiment of the present disclosure.
Figure 2:
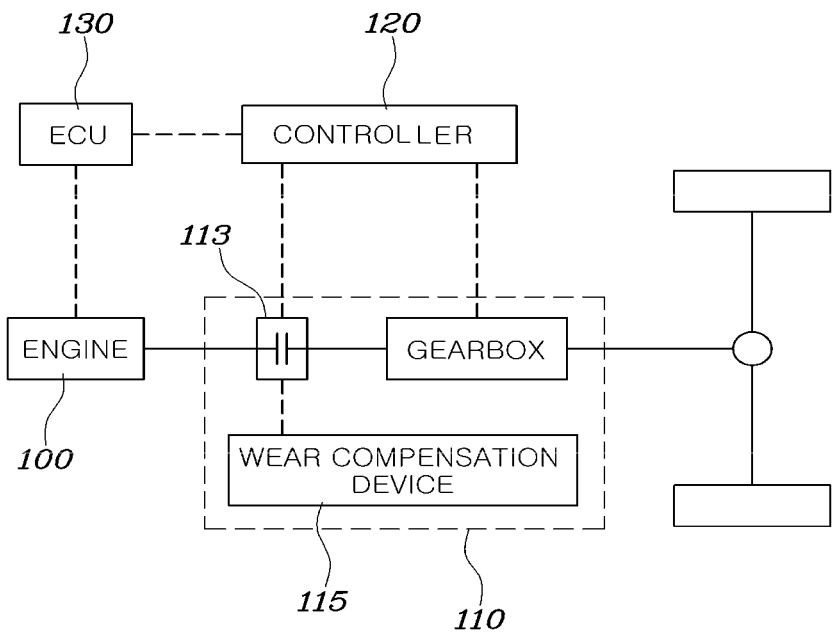
FIG. 2 is a block diagram illustrating a device for protecting a vehicle clutch, according to an embodiment of the present disclosure.

FIG. 1 is a flowchart illustrating a method for protecting a vehicle clutch, according to an embodiment of the present disclosure, and FIG. 2 is a block diagram illustrating a device for protecting a vehicle clutch, according to an embodiment of the present disclosure.

Referring to FIGS. 1 and 2, a method for protecting a vehicle clutch may include a check step (S10) in which a controller 120 checks the mileage of a vehicle and the number of times a clutch wear compensation device is operated; after the check step (S10), a calculation step (S20) in which the controller 120 calculates a clutch thermal severity level, which represents the degree of the thermal severity of a clutch, based on the mileage and the number of times the wear compensation device is operated; and a control step (S30) in which the controller 120 controls at least one of the shifting pattern of the vehicle and engine RPM (S30) depending on the clutch thermal severity level after the calculation step (S20).

In the case of the clutch 113 of a transmission 110, because the disc is worn down by friction generated during the clutch slip or clutch engagement, wear compensation control is performed to acquire the accurate touch point of the clutch. The wear compensation device 115 may operate when the variation in the clutch touch point is greater than a reference value.

Particularly, when the driving style of a driver is aggressive or when the vehicle is mainly driven on a city road or a sloping road, slip of the clutch 113 frequently occurs, thus increasing wear of the disc of the clutch 113. In other words, when the clutch 113 is in a harsh environment, the wear compensation device 115 may frequently operate.

Conversely, when a driver maintains a steady speed while driving, or when the vehicle is mainly driven on an expressway or on a flat road, slip of the clutch 113 occurs infrequently, thus the number of times the wear compensation device 115 is operated decreases compared to the case in which the clutch 113 is in a harsh environment.

Therefore, the controller 120 calculates the clutch thermal severity level based on the number of times the wear compensation device 115 is operated, whereby the clutch thermal severity level may reflect the driving style of a driver and the condition of a road on which the vehicle is mainly driven.

Additionally, the controller 120 may calculate the clutch thermal severity level based on the mileage of the vehicle. In other words, even though the number of times the wear compensation device 115 is operated is large, if the vehicle has a high mileage, it may be determined that the clutch is worn down not because the clutch has been used in a harsh environment but because the vehicle has been driven a long distance.

In other words, because the controller 120 reflects not only the number of times the wear compensation device 115 has been used but also the mileage of the vehicle to determine the clutch thermal severity level, the driving style of the driver and the condition of a road on which the vehicle is mainly driven are more accurately predicted.

Here, the controller 120 may receive information about the mileage from an additional sensor for measuring mileage.

Figure 3:
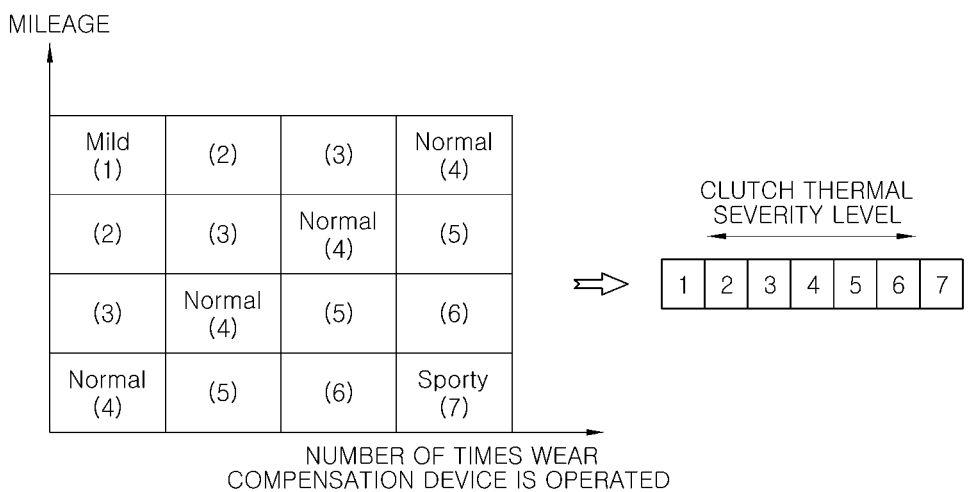
FIG. 3 is a view illustrating a variation in a clutch thermal severity level based on the number of times a wear compensation device is operated compared to the mileage of a vehicle.

FIG. 3 is a view illustrating a variation in a clutch thermal severity level based on the number of times a wear compensation device has been operated compared to the mileage of a vehicle. Referring to FIG. 3, at the calculation step (S20), the clutch thermal severity level is calculated to be inversely proportional to the mileage, and to be proportional to the number of times that the wear compensation device 115 is operated.

In other words, when the ratio of the number of times the wear compensation device 115 is operated to the mileage of the vehicle is larger, the clutch thermal severity level is higher, and this indicates that the driver frequently performs sudden acceleration and deceleration or frequently drives in the city or on a sloping road.

Conversely, when the ratio of the number of times the wear compensation device 115 is operated to the mileage of the vehicle is lower, the clutch thermal severity level is smaller, and this indicates that the driver maintains a steady speed while driving, or frequently drives at high speed or on a flat road.

For example, the clutch thermal severity level ranges from 1 to 7 in FIG. 3, and when the ratio of the number of times the wear compensation device 115 is operated to the mileage is large, it points to the lower-right of the graph, which corresponds to a higher clutch thermal severity level. Conversely, when the ratio of the number of times the wear compensation device 115 is operated to the mileage is small, it points to the upper-left of the graph, which corresponds to a lower clutch thermal severity level. However, the clutch thermal severity level, which ranges from 1 to 7, in the embodiment is only an example, and it may vary depending on the determination of a designer.

Meanwhile, the calculation step (S20) may be performed only when the mileage of the vehicle is equal to or greater than a predetermined distance. Alternatively, the calculation step (S20) may be performed only when the number of times the wear compensation device 115 is operated is equal to or greater than a predetermined count value.

In other words, the controller 120 performs the control step (S30) by calculating the clutch thermal severity level only when the mileage of the vehicle or the number of times the wear compensation device 150 is operated is equal to or greater than a predetermined reference value, whereby the reliability of the clutch thermal severity level may be improved. Here, the predetermined distance and the predetermined count value may be differently set depending on the vehicle or the determination of the designer.

The controller 120 may prevent the clutch from overheating by controlling a shifting pattern based on the calculated clutch thermal severity level. Specifically, as the clutch thermal severity level is higher, the controller 120 may control the upshifting pattern at the control step (S30) so that upshifting is performed at a higher speed compared to an existing upshifting pattern.

In other words, as the clutch thermal severity level is higher, the time at which gear shifting occurs is delayed though the vehicle speed increases. By delaying upshifting even if the vehicle speed increases, frequent upshifting is prevented, thus preventing the increase in the amount of slip of the clutch 113.

Figure 4:
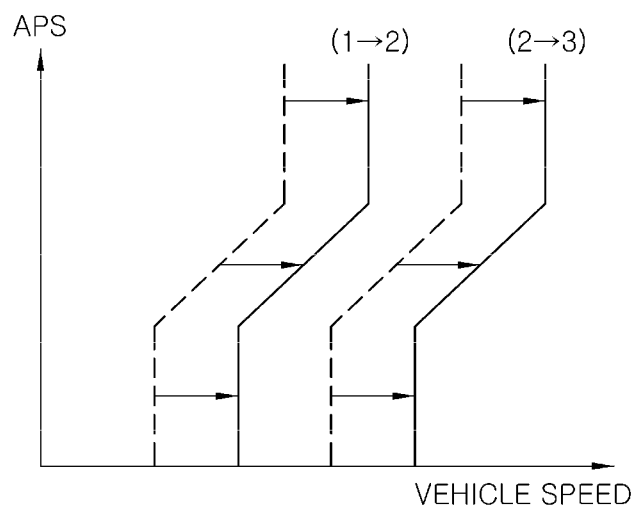
FIG. 4 is a graph illustrating shifting pattern control according to an embodiment of the present disclosure.

FIG. 4 is a graph illustrating shifting pattern control according to an embodiment of the present disclosure. Referring to FIG. 4, the shifting pattern marked with a dotted line indicates an existing shifting pattern, and the shifting pattern marked with a solid line indicates a shifting pattern in which the vehicle speed at which upshifting is to be performed is raised. As illustrated in FIG. 4, the shifting pattern is controlled to raise the speed at which upshifting is to be performed, as the clutch thermal severity level is higher. Specifically, both in the shifting pattern for upshifting from first to second gear and in the shifting pattern for upshifting from second to third gear, the vehicle speed at which the upshifting is to be performed is raised. Additionally, upshifting patterns not illustrated in the drawings are also controlled to raise the speed at which the upshifting is to be performed.

Also, as the clutch thermal severity level is higher, the controller 120 may control the downshifting pattern at the control step (S30) so that downshifting is performed at a higher speed compared to an existing shifting pattern.

In other words, as the clutch thermal severity level is higher, the frequency of sudden acceleration and deceleration by a driver is higher. Therefore, it is advantageous to drive the engine 100 at a high torque level. For example, when the driver suddenly accelerates the vehicle, as the opening degree of an APS and the vehicle speed increase, kick-down shifting, in which the transmission shifts into a lower gear, may occur. However, if the downshifting pattern is changed to raise the speed at which the downshifting is performed, the frequency of occurrence of the kick-down shifting is decreased, whereby the amount of the clutch slip attributable to the kick-down shifting may be reduced.

Consequently, as the clutch thermal severity level is higher, the controller 120 controls an upshifting pattern and downshifting pattern to raise the speed at which upshifting or downshifting is performed. Therefore, it is possible to reduce the cases in which the clutch 110 generates heat due to clutch slip in a harsh environment.

Meanwhile, as the clutch thermal severity level is higher, the controller 120 may control to lower engine RPM compared to current engine RPM. This is another embodiment for decreasing the amount of slip of the clutch 110 when the vehicle is started.

Figure 5:
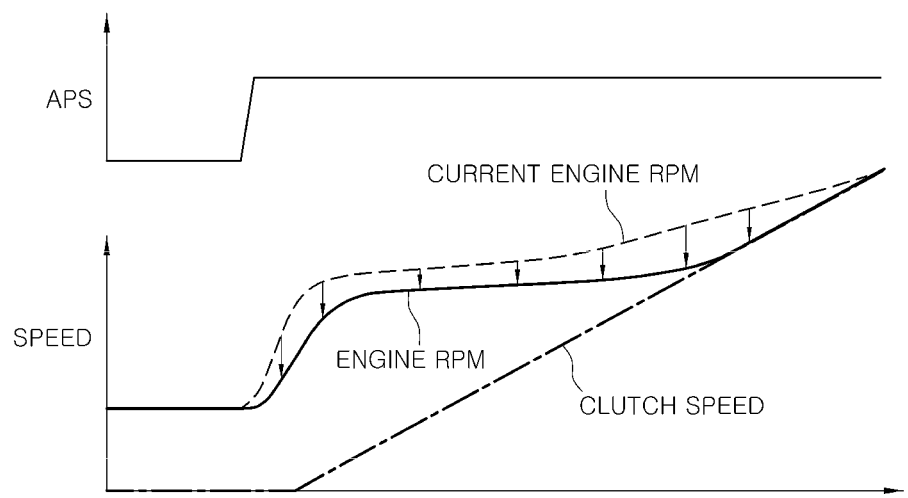
FIG. 5 is a graph illustrating engine RPM control according to an embodiment of the present disclosure.

FIG. 5 is a graph illustrating engine RPM control according to an embodiment of the present disclosure. Referring to FIG. 5, as the opening degree of the APS increases, both the engine RPM and the clutch speed increase. On the graph, an area between the line indicating the engine RPM and the line indicating the clutch speed represents the amount of slip.

In other words, as the clutch thermal severity level is higher, the difference between the clutch speed and the engine RPM is decreased by lowering the engine RPM from the current engine RPM marked with the dotted line and the clutch 110 is connected to the engine 100 earlier, whereby the amount of slip of the clutch 110 may be minimized. Therefore, the clutch 110 may be prevented from overheating.

According to the vehicle clutch protection method configured as described above, the driving style of a driver or the condition of a road on which a vehicle is mainly driven may be determined based on the mileage of the vehicle and the number of times that a wear compensation device is operated, and a control method for preventing the clutch from overheating is performed based on the clutch thermal severity level, whereby occurrence of failure caused by overheating of the clutch may be prevented.

Additionally, the clutch 113, the wear compensation device 115, and the gearbox, illustrated in FIG. 2, are arranged inside the transmission 110, and a Transmission Control Unit (TCU) may be used as the controller 120 for controlling the transmission 110. Also, the controller 120 may adjust the RPM of the engine 100 by transmitting a control signal to the Engine Control Unit (ECU) 130 based on the clutch thermal severity level.

Although these embodiments of the present disclosure has been described for illustrative purposes, those skilled in the art will appreciate that various modifications, additions and substitutions are possible, without departing from the scope and spirit of the invention as disclosed in the accompanying claims.

What is claimed is:

1. A method for protecting a vehicle clutch, comprising:
    a check step in which a controller checks a mileage of a vehicle and a number of times a clutch wear compensation device is operated;
    after the check step, a calculation step in which the controller calculates a clutch thermal severity level, which indicates a degree of thermal severity of the clutch, based on the mileage and the number of times the wear compensation device is operated; and
    after the calculation step, a control step in which the controller controls at least one of a shifting pattern of the vehicle and revolution per minute (RPM) of engine depending on the clutch thermal severity level.

2. The method of claim 1, wherein in the calculation step, the clutch thermal severity level is calculated to be inversely proportional to the mileage and to be proportional to the number of times the wear compensation device is operated.

3. The method of claim 1, wherein the clutch wear compensation device operates when a variation in a clutch touch point is greater than a reference value.

4. The method of claim 1, wherein the calculation step is performed only when the mileage of the vehicle is equal to or greater than a predetermined distance.

5. The method of claim 1, wherein the calculation step is performed only when the number of times the wear compensation device is operated is equal to or greater than a predetermined count value.

6. The method of claim 1, wherein in the control step, as the clutch thermal severity level is higher, the controller controls an upshifting pattern to perform upshifting at a higher speed compared to an existing upshifting pattern.

7. The method of claim 1, wherein in the control step, as the clutch thermal severity level is higher, the controller controls a downshifting pattern to perform downshifting at a higher speed compared to an existing downshifting pattern.

8. The method of claim 1, wherein in the control step, as the clutch thermal severity level is higher, the controller controls the engine RPM to be less than current engine RPM.

9. A method for protecting a clutch in a vehicle having an engine, a controller and a clutch wear compensation device, the method comprising:
    determining, by the controller, a mileage of the vehicle;
    determining, by the controller, a number of times the clutch wear compensation device has been operated;
    calculating, by the controller, a clutch thermal severity level that is indicative of a degree of thermal severity of the clutch, based on the mileage and the number of times the wear compensation device has been operated; and
    controlling, by the controller, at least one of a shifting pattern of the vehicle and revolution per minute (RPM) of the engine based on the calculated clutch thermal severity level.

10. The method of claim 9, wherein the clutch thermal severity level is calculated to be inversely proportional to the mileage and to be proportional to the number of times the wear compensation device has been operated.

11. The method of claim 9, wherein the clutch wear compensation device operates when a variation in a clutch touch point is greater than a reference value.

12. The method of claim 9, wherein the calculation step is performed only when the mileage of the vehicle is equal to or greater than a predetermined distance.

13. The method of claim 9, wherein the calculation step is performed only when the number of times the wear compensation device has been operated is equal to or greater than a predetermined count value.

* * * * *